Nov. 18, 1941.   G. I. GOODWIN   2,263,083
CLUTCH PLATE
Filed June 10, 1940   3 Sheets-Sheet 1
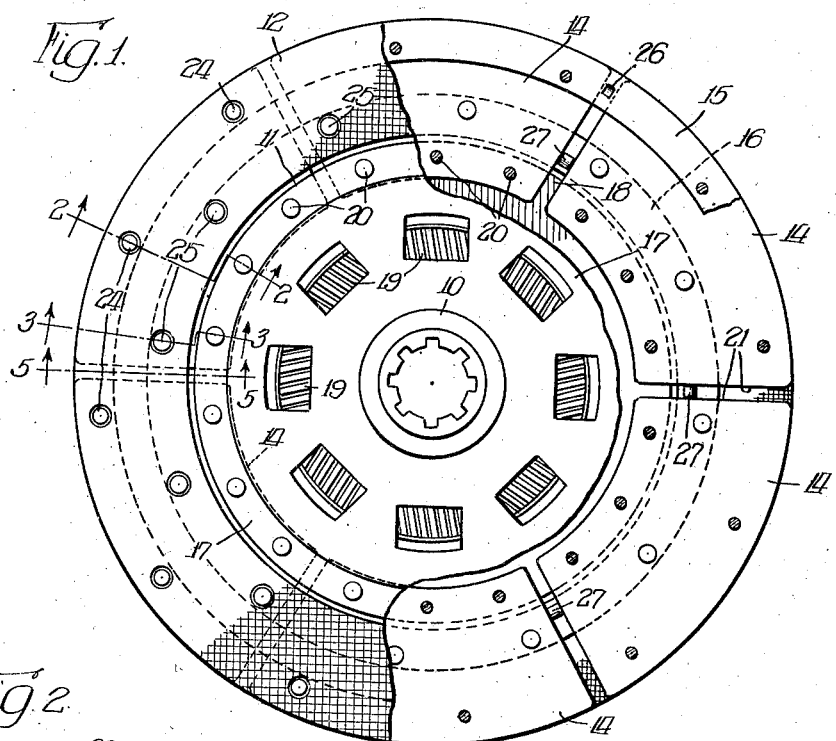
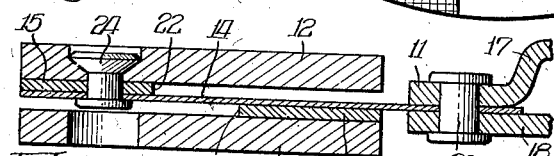
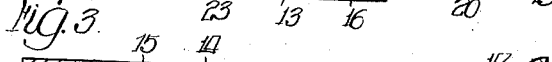
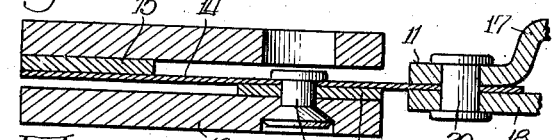
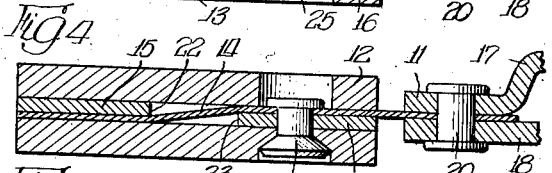
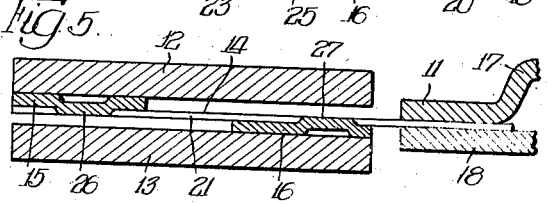
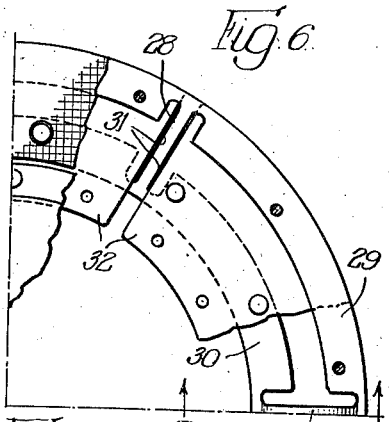
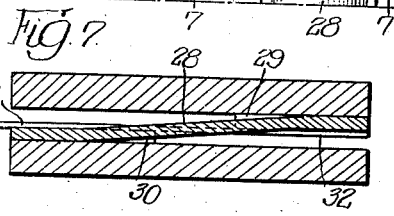
INVENTOR.
George I. Goodwin,
BY Cromwell, Greist + Warden
attys.

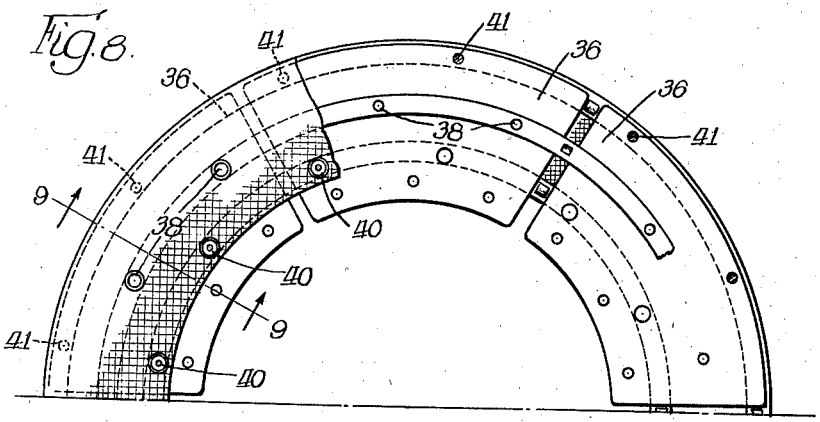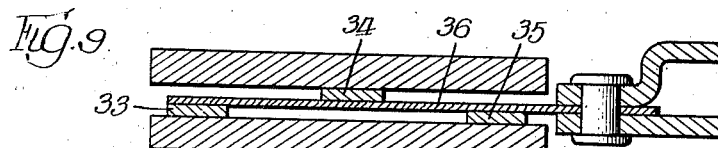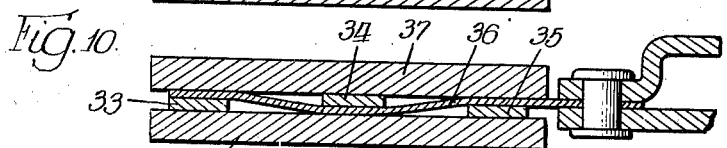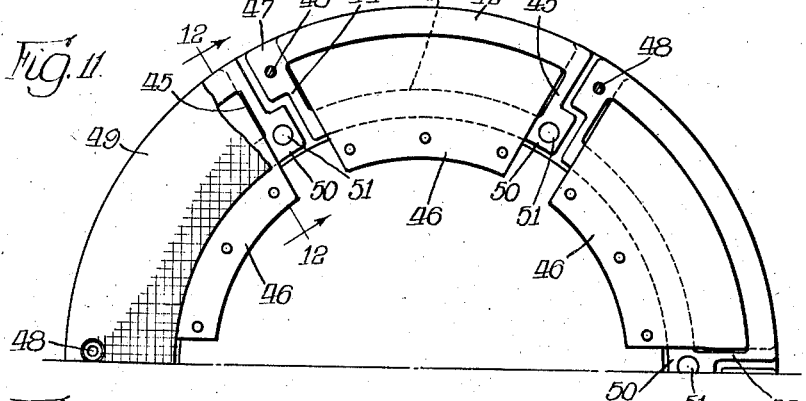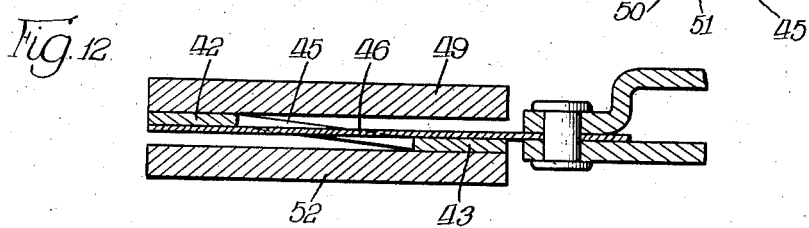

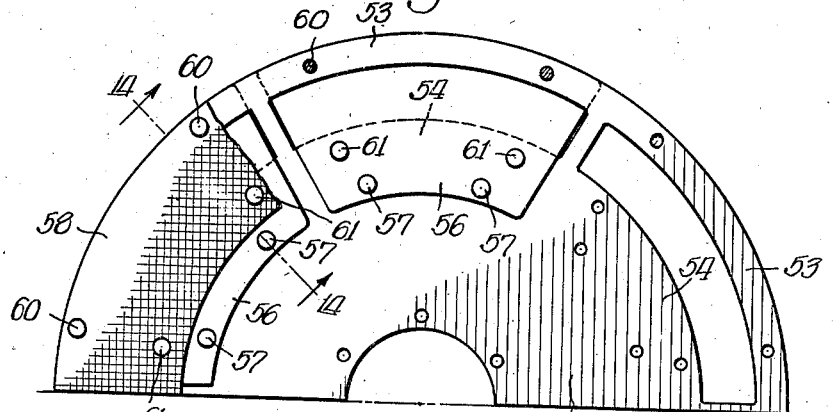
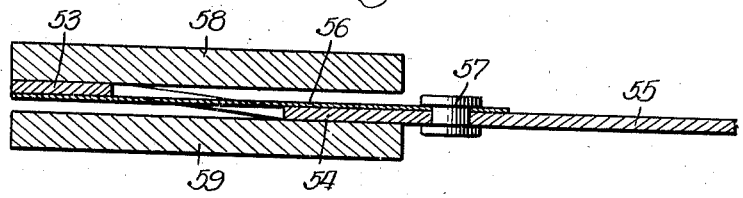
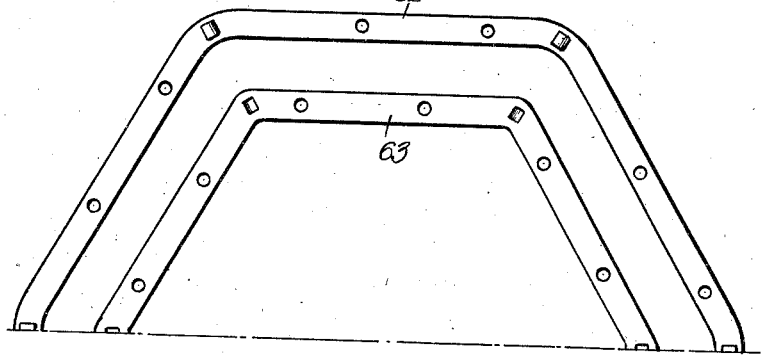

Patented Nov. 18, 1941

2,263,083

UNITED STATES PATENT OFFICE 2,263,083

CLUTCH PLATE

George I. Goodwin, Detroit, Mich.

Application June 10, 1940, Serial No. 339,612

9 Claims. (Cl. 192—107)

This invention has to do with clutch plates, and is particularly concerned with clutch plates of the type in which a resiliently yieldable cushioning structure is employed adjacent the periphery of the plate between the annular friction facings.

The principal object of the invention is to provide a novel cushioning structure—in the nature of an improvement on the structure disclosed in Goodwin Patent No. 1,981,505—which affords a uniformly resilient support for the facings, has a low spinning inertia, is simple and inexpensive to manufacture, and will withstand the most severe usage.

An important feature of the improved cushion is the provision of circumferentially extending spring-flexing members in combination with thin segmental springs which extend outwardly from the center portion of the plate into circumferentially interlocked association with formations presented by the spring-flexing members.

While the foregoing statements are indicative in a general way of the nature of the invention, other more specific objects and advantages will be apparent to those skilled in the art upon a full understanding of the novel cushioning structure.

Several different embodiments of the invention are presented herein for the purpose of exemplification, but it will of course be appreciated that the invention is capable of being embodied in various other structurally modified forms coming equally within the scope of the appended claims.

In the accompanying drawings:

Fig. 1 is a face view of a clutch plate equipped with a cushioning structure constructed in accordance with the invention, with portions of the assembly broken away to expose other otherwise concealed portions;

Fig. 2 is an enlarged radial section through the outer portion of the plate, taken on the line 2—2 of Fig. 1;

Fig. 3 is a similar section, taken on the line 3—3 of Fig. 1;

Fig. 4 corresponds to Fig. 3 but shows the plate with the cushioning structure in its fully compressed condition;

Fig. 5 is another section, taken on the line 5—5 of Fig. 1;

Fig. 6 is a partially broken away face view of one-quarter of another clutch plate, showing a modified form of the invention;

Fig. 7 is an enlarged radial section through the outer portion of the plate shown in Fig. 6, taken on the line 7—7 of Fig. 6;

Fig. 8 is a partially broken away face view of one-half of another clutch plate, with the center portion of the plate entirely removed, showing another modification of the invention;

Fig. 9 is an enlarged radial section through the outer portion of the plate shown in Fig. 8, taken on the line 9—9 of Fig. 8;

Fig. 10 corresponds to Fig. 9 but shows the plate with the cushioning structure in its compressed condition;

Fig. 11 is a partially broken away face view of one-half of another clutch plate, with the center portion removed, showing still another modification of the invention;

Fig. 12 is an enlarged radial section through the outer portion of the plate shown in Fig. 11, taken on the line 12—12 of Fig. 11;

Fig. 13 is a partially broken away face view of one-half of still another clutch plate, showing a further modification of the invention;

Fig. 14 is an enlarged radial section through the outer portion of the plate shown in Fig. 13, taken on the line 14—14 of Fig. 13; and Fig. 15 is a face view of a pair of spring-flexing rings, showing a modified shaping of the same.

Referring first to Figs. 1 to 5 inclusive, the clutch plate shown in those views includes a hub 10, a disk 11, two annular friction facings 12 and 13, a plurality of segmental springs 14, and two spring-flexing rings 15 and 16.

The disk 11 is shown as composed of two cover plates 17 and 18, with coil springs 19 for yieldingly resisting rotation of the cover plates with respect to a flange (not shown) on the hub within certain narrow limits, but these disk details have nothing to do with the present invention. So far as the invention is concerned the disk 11 may be considered as being rigidly connected with the hub.

The disk 11 is centrally apertured and is secured at its inner edge to the hub 10. The springs 14 are arranged in annular area about the disk 11, in outwardly projecting relation to the outer edge of the latter, and are fastened at their inner edges to the outer edge of the disk by rivets 20, the cover plates 17 and 18 clamping the springs tightly to afford the desired rigidity of support. The springs 14 are thin resilient sheets of spring metal, and are preferably flat in the uncompressed condition of the plate. Their adjacent side edges 21 are preferably spaced circumferentially from each other to leave narrow gaps between the same.

The spring-flexing rings 15 and 16 are positioned against the opposite faces of the springs 14, in concentric relation to the plate. The outer ring 15 is considerably larger than the inner ring 16, the inner edge 22 of the outer ring being radially as well as axially offset from the outer edge 23 of the inner ring, whereby to permit the two rings to move into a more or less nested relationship when the intervening arcuate portions of the springs 14 are flexed along arcuate bend lines during compression of the plate. The rings 15 and 16 are preferably somewhat thicker than the springs 14, and are preferably though not necessarily of the rectangular radial section shown. The amount of cushion obtained can be altered by varying the thickness of the rings, while the rate of cushion can be altered by varying the thickness of the springs and also varying the radial distance separating the rings.

The facings 12 and 13 are positioned respectively against the rings 15 and 16, the outer edge of the facing 12 being preferably disposed adjacent the outer edge of the ring 15 and the outer edges of the springs 14, and the inner edge of the facing 13 being preferably disposed adjacent the inner edge of the ring 16. The facing 12 and the outer spring-flexing ring 15 are fastened to the outer portions of the springs 14 by rivets 24, while the facing 13 is fastened to the inner ring 16 and the inner portions of the springs 14 by rivets 25.

At the locations of the gaps between the side edges 21 of the springs 14 the rings 15 and 16 are provided respectively with axially projecting lugs 26 and 27, preferably in the form of stamped-out embossments, which lugs engage and circumferentially interlock with the side edges 21 of the springs 14, relieving in large measure the facing-attaching rivets 24 and 25 from the shearing stresses incident to the metal-to-metal association of the rings with the springs.

In the modification shown in Figs. 6 and 7 the concentric spring-flexing members are integrally connected with each other at circumferentially spaced intervals by radially extending webs 28, which webs extend inwardly and axially at an angle to the plane of the plate from the outer ring portion 29 to the inner ring portion 30. These webs engage intermediate their ends with the side edges 31 of the segmental springs 32, thus providing a circumferential interlock between the springs 32 and the ring portions 29 and 30.

The cushion structure shown in Figs. 8 to 10 inclusive is similar to that shown in Figs. 1 to 5 inclusive except for the employment of three spring-flexing rings 33, 34 and 35 in place of two. In this structure the intermediate ring 34 is attached to the segmental springs 36 and to the facing 37 at the pressure plate side of the assembly, by rivets 38, and the innermost ring 35 is attached to the springs 36 and to the facing 39 at the pressure plate side of the assembly by rivets 40, the outermost ring 33 being attached preferably to the springs 36, without being attached to the facing 39, by other rivets 41. With this modified construction a double flexing of the springs 36 is obtained.

In the modification shown in Figs. 11 and 12 the outer and inner concentric spring-flexing members, instead of being formed as endless rings, are formed as outer and inner concentric ring sections 42 and 43, which sections are integrally connected at their ends by radially extending end strips 44 and 45. The outer ends of the strips 44 and 45 are disposed in the plane of the outer ring sections 42 and are offset axially with respect to their inner ends, which inner ends are disposed in the plane of the inner ring sections 43. The springs 46 pass through the arcuate gaps present between the outer and inner ring sections 42 and 43 and the end strips 44 and 45. The end strips 44 are provided at their outer ends with circumferentially projecting tabs 47 which receive the rivets 48 used in attaching the facing 49, while the end strips 45 are provided at their inner ends with tabs 50 which receive the rivets 51 used in attaching the facing 52.

In the modification shown in Figs. 13 and 14 the concentric outer and inner spring-flexing members 53 and 54 are made as integral portions of a solid one-piece disk 55, the springs 56 being attached to the disk by rivets 57, and the facings 58 and 59 being attached to the spring-flexing portions 53 and 54 of the disk and to the springs 56 by rivets 60 and 61.

Fig. 15 shows a pair of concentric spring-flexing rings 62 and 63, which, instead of being circular, are of polygonal form, with their confronting edges straight and parallel to each other. With straight-edged spring-flexing members the springs will of course be flexed along straight as distinguished from arcuate bend lines. These particular spring-flexing rings 62 and 63 are designed for use in place of the corresponding rings 15 and 16 in the embodiment shown in Figs. 1 to 5 inclusive, but it will of course be appreciated that the same straight-line bending feature might be incorporated, by suitable alteration, in various other embodiments of the invention including those shown in the other views.

I claim:

1. In a clutch plate, the combination with a disk, and a pair of annular friction facings beyond the outer edge of the disk, of circumferentially spaced spring portions secured to and extending outwardly from the outer edge of the disk into positions between the facings, axially and radially offset spring-flexing members arranged between the facings at opposite sides of the spring portions, connections between each of the facings, the spring-flexing member adjacent thereto and the spring portions, and stops associated with the spring-flexing members between the spaced edges of the spring portions in circumferentially interlocked association with such edges.

2. In a clutch plate, the combination with a disk, and a pair of annular friction facings beyond the outer edge of the disk, of circumferentially spaced spring portions secured to and extending outwardly from the outer edge of the disk into positions between the facings, axially and radially offset spring-flexing members arranged between the facings at opposite sides of the spring portions, connections between each of the facings, the spring-flexing member adjacent thereto and the spring portions, and integral formations on the spring-flexing members between the spaced edges of the spring portions in circumferentially interlocked association with such edges.

3. In a clutch plate, the combination with a disk, and a pair of annular friction facings beyond the outer edge of the disk, of circumferentially spaced segmental springs secured to and extending outwardly from the outer edge of the disk into positions between the facings, axially offset spring-flexing rings of different radial sizes arranged concentrically between the facings at opposite sides of the springs, connections between each of the facings, the spring-flexing member adjacent thereto and the springs, and formations on the rings between the spaced edges of the springs in circumferentially interlocked association with such edges.

4. In a clutch plate, the combination with a disk, and a pair of annular friction facings beyond the outer edge of the disk, of circumferentially spaced segmental springs secured to and extending outwardly from the outer edge of the disk into positions between the facings, axially offset spring-flexing rings of different radial sizes arranged concentrically between the facings at opposite sides of the springs, connections between each of the facings, the spring-flexing member adjacent thereto and the springs, and axially projecting embossments on the rings between the spaced edges of the springs in circumferentially interlocked association with such edges.

5. In a clutch plate, the combination with a disk, and a pair of annular friction facings beyond the outer edge of the disk, of circumferentially spaced spring portions secured to and extending outwardly from the outer edge of the disk into positions between the facings, axially and radially offset spring-flexing members arranged between the facings at opposite sides of the spring portions, connections between each of the facings, the spring-flexing member adjacent thereto and the spring portions, and stops associated with the spring-flexing members between the spaced edges of the spring portions in circumferentially interlocked association with such edges, said spring-flexing members being connected together at circumferentially spaced points by radially extending members, and said radially extending members constituting said stops.

6. In a clutch plate, the combination with a disk, and a pair of annular friction facings beyond the outer edge of the disk, of circumferentially spaced spring portions secured to and extending outwardly from the outer edge of the disk into positions between the facings, axially and radially offset spring-flexing members arranged between the facings at opposite sides of the spring portions, connections between each of the facings, the spring-flexing member adjacent thereto and the spring portions, and stops associated with the spring-flexing members between the spaced edges of the spring portions in circumferentially interlocked association with such edges, said spring-flexing members being integrally connected together at circumferentially spaced points by radially extending portions, and said radially extending portions constituting said stops.

7. In a clutch plate, the combination with a disk, and a pair of annular friction facings beyond the outer edge of the disk, of circumferentially spaced spring portions secured to and extending outwardly from the outer edge of the disk into positions between the facings, axially and radially offset spring-flexing members arranged between the facings at opposite sides of the spring portions, connections between each of the facings, the spring-flexing member adjacent thereto and the spring portions, and stops associated with the spring-flexing members between the spaced edges of the spring portions in circumferentially interlocked association with such edges, said spring-flexing members being uniformly spaced from each other to produce equidistant bend lines in said spring portions.

8. In a clutch plate, the combination with a disk, and a pair of annular friction facings beyond the outer edge of the disk, of circumferentially spaced spring portions secured to and extending outwardly from the outer edge of the disk into positions between the facings, axially and radially offset spring-flexing members arranged between the facings at opposite sides of the spring portions, and connections between each of the facings, the spring-flexing member adjacent thereto and the spring portions, said spring-flexing members being integrally connected together at circumferentially spaced points by radially extending portions.

9. In a clutch plate, the combination with a disk, and a pair of annular friction facings beyond the outer edge of the disk, of circumferentially spaced spring portions secured to and extending outwardly from the outer edge of the disk into positions between the facings, axially and radially offset spring-flexing members arranged between the facings at opposite sides of the spring portions, and connections between each of the facings, the spring-flexing member adjacent thereto and the spring portions, said spring-flexing members being arcuate in shape and being integrally connected together at circumferentially spaced points by radially extending portions.

GEORGE I. GOODWIN.